(No Model.)
S. F. LEAKE.
GATE FOR PNEUMATIC DISPATCH TUBES.
No. 519,718. Patented May 15, 1894.
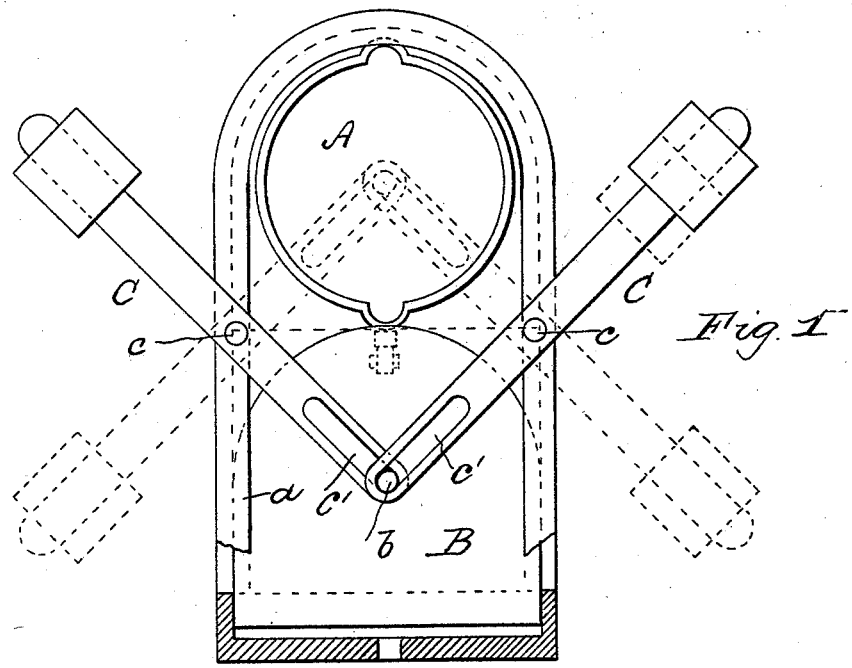
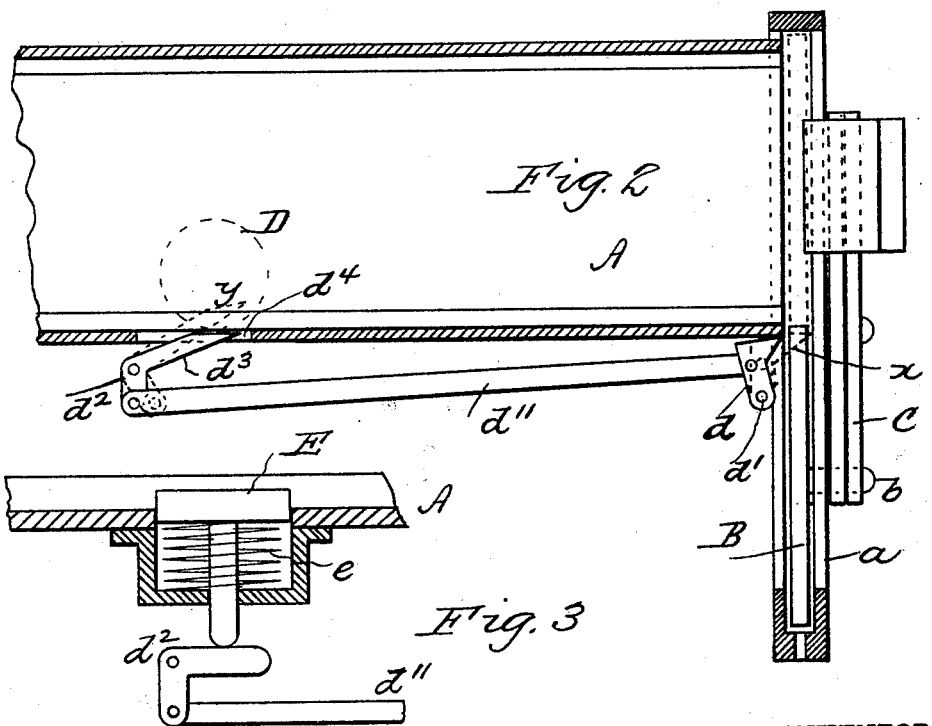
WITNESSES:
R. W. Van Staven
Louis E. Pike,
INVENTOR
Samuel F. Leake
By S. J. Van Staven
Attorney.

UNITED STATES PATENT OFFICE.

SAMUEL F. LEAKE, OF PHILADELPHIA, PENNSYLVANIA, ASSIGNOR TO THE LEAKE PNEUMATIC TRANSPORTATION COMPANY, OF SAME PLACE.

GATE FOR PNEUMATIC DISPATCH-TUBES.

SPECIFICATION forming part of Letters Patent No. 519,718, dated May 15, 1894.

Application filed March 1, 1893. Serial No. 464,208. (No model.)

*To all whom it may concern:*

Be it known that I, SAMUEL F. LEAKE, a citizen of the United States, residing at Philadelphia, in the county of Philadelphia and State of Pennsylvania, have invented certain new and useful Improvements in Gates for Pneumatic Dispatch-Tubes; and I do hereby declare the following to be a full, clear, and exact description of the invention, such as will enable others skilled in the art to which it appertains to make and use the same.

My invention has relation to vertically sliding gates for pneumatic dispatch tube systems; and it has for its object a simple and effective form of gate which descends by gravity to open it and is easily and quickly raised to close it and when elevated is locked in such position until such locking mechanism is released by a traveling carrier, or in other words the gate is automatically opened and manually closed.

My invention accordingly consists of the combinations, constructions, and arrangements of parts as hereinafter more particularly described in the specification and pointed out in the claims.

Reference is had to the accompanying drawings, in which—

Figure 1 is an end view of the tube, gate and guides therefor, partly in section, embodying my invention. Fig. 2 is a longitudinal section of the same, and elevation of the locking mechanism in its released position; and Fig. 3 is a sectional elevation of a modified form of contact device or lever for the locking mechanism.

A represents the pneumatic tube which may be any part of the system having an end frame or guide $a$ for a gate B which is lowered to open it from the tube A and raised to close said tube. Said gate B is provided with counterbalancing levers C C pivoted at $c$ to the guide frame $a$ and having lower slotted ends $c'$ which engage a stud $b$ on the gate B. By depressing the levers C when in position shown in full lines Figs. 1 and 2 to position indicated by dotted lines in said figures, the gate B is raised to close the end of tube A and is locked in such position by a pawl $d$, see more plainly in Fig. 2, which passes underneath the lower edge of the gate B when raised as indicated by dotted lines $x$, Fig. 2. Said pawl $d$ is suitably pivoted at $d'$ to the frame $a$ or otherwise as desired and has a link connection $d''$ with a pivoted lever $d^2$ the arm $d^3$ of which projects through a slot $d^4$ into tube A in the path of the carrier or its wheels D. If lever $d^2$ and pawl $d$ are in position shown by dotted lines $y$ and $x$ respectively the gate is raised and locked. A passing carrier wheel D actuates lever $d^2$ to depress it and withdraws pawl $d$ from and unlocks gate B which falls or descends to open the end of pipe A, see more plainly full lines in Fig. 2.

If desired instead of permitting the end $d^3$ to project into the tube A it may abut against a plunger E having a reacting spring $e$ as indicated in Fig. 3, the advantage of which construction is that there are no slots $d^4$ in the tube A.

It is evident that the details of construction of the parts described may be greatly varied and hence I do not limit myself to the same as shown and described.

What I claim is—

1. In combination with a pneumatic dispatch tube, a counterbalanced gate which drops to open the tube and is elevated to close said tube and a locking mechanism for holding said gate in its elevated position under the control of a traveling carrier for releasing said locking mechanism, substantially as set forth.

2. In combination with tube A, the end or outside guide frame $a$, gate B having pivoted counterbalancing levers C, locking pawl $d$, lever $d^2$, link $d''$ connecting said pawl and lever, and actuating mechanism for lever $d^2$ extending into the tube A and operated by a traveling carrier, substantially as set forth.

In testimony whereof I affix my signature in presence of two witnesses.

SAMUEL F. LEAKE.

Witnesses:
FRANK H. MASSEY,
S. J. VAN STAVOREN.